United States Patent [19]

Schulte et al.

[11] Patent Number: 4,956,592
[45] Date of Patent: Sep. 11, 1990

[54] AUTOMATICALLY POSITIONABLE CHAIR

[75] Inventors: Stephen R. Schulte; Stephen C. Wissel, both of Cincinnati; John B. Wilker, Sr., Fairfield, all of Ohio

[73] Assignee: Midmark Corporation, Versailles, Ohio

[21] Appl. No.: 331,931

[22] Filed: Mar. 31, 1989

[51] Int. Cl.⁵ .................... G05B 11/01; A47C 1/02
[52] U.S. Cl. .................... 318/560; 318/286; 318/468; 318/484
[58] Field of Search ............ 318/560, 561, 624, 264, 318/265, 266, 272, 275, 277, 286, 430, 432, 433, 466, 467, 468, 484

[56] References Cited

U.S. PATENT DOCUMENTS

| | | | |
|---|---|---|---|
| 4,258,301 | 3/1981 | Kawa | 318/599 X |
| 4,423,365 | 12/1983 | Turner | 318/561 |
| 4,486,797 | 12/1984 | Workman | 318/561 X |
| 4,490,659 | 12/1984 | Hansen | 318/484 |
| 4,503,374 | 3/1985 | Sakano | 318/616 |
| 4,516,805 | 5/1985 | Leeper et al. | 297/330 |
| 4,706,194 | 11/1987 | Webb et al. | 318/466 X |
| 4,845,415 | 7/1989 | Steely | 318/466 X |
| 4,874,995 | 10/1989 | Kawai et al. | 318/484 |

*Primary Examiner*—Bentsu Ro
*Attorney, Agent, or Firm*—Biebel, French & Nauman

[57] ABSTRACT

A programmable automatic positioning chair for medical application. The chair has moveable support surfaces which are driven by electric motors to preprogrammed positions. Motor speed is determined by measuring the motor current, and the motor speed is integrated by a microprocessor to produce a computed value of surface position. The chair operates "open loop" without any feedback from position sensors.

15 Claims, 10 Drawing Sheets

AUTOMATICALLY POSITIONABLE CHAIR

BACKGROUND OF THE INVENTION

This invention relates to the field of automatic positioning chairs for medical application. Such chairs are sometimes referred to by the general term "table" and when the word "chair" is used herein, it is intended to include such a "table". The invention has particular application to podiatry chairs which may be automatically elevated or tilted and which may have automatically moveable back supports or foot supports.

Prior art chairs of the type with which this invention is concerned use feedback sensors for measuring the position of moveable surfaces and signaling the measured position to a motor controller. Automatic positioning control is achieved by comparing a position command with a measured position to develop an error signal. The position motors are driven until the error signal has been reduced to zero. At this point, the controller knows that the desired position is achieved.

Prior art chairs of the above described type have also been provided with control units having switches which may be operated to move various support surfaces to desired locations. When the desired locations are achieved, the operator activates a switch directing the control system to store the positions of all moveable surfaces. Thereafter the chair may be returned to the same positional configuration by operating the same or another switch.

There has been a need for automatically positionable chairs capable of returning to a programmed position without the use of feedback sensors. Such sensors complicate the design and increase the cost of the chair. It is apparent that such a chair may be operated "open loop" without position sensors by simply measuring the time required to move the chair surfaces to a desired position and treating such movement time as a measurement of position. However, it is desired to move such chairs to a variety of preprogrammed positions under various load conditions which may be encountered during movement with patients of differing weights seated thereon. Drive motors are prone to operate at different speeds under different load conditions. This is especially true for electric motors which are designed with the anticipated operating load in mind and which do not have substantial overcapacity. It is impractical to utilize elapsed movement time as a measure of surface position when the motor speed changes with load.

SUMMARY OF THE INVENTION

This invention provides a programmably positionable chair which may be directed to move to selectively preprogrammed positions without any use of position feedback. Such positioning control is achieved by providing electric motors for moving the positionable support surfaces and measuring the motor current during surface movement. It has been found that variable load conditions affect the motor current as well as the motor speed and that there is a relationship between motor current and motor speed which is independent of load for a given supply voltage. In accordance with this invention, the relationship between motor current and motor speed for a supply voltage of interest is experimentally established. This relationship is programmed into the controller, so that motor current measurements may be used as an indication of motor speed. The motor speed, so determined, is integrated over the movement time to establish surface position. The chair support surfaces are driven to computed positions on an open loop basis without any position feedback.

A chair in accordance with this invention may use anywhere from one to four or more electric motors for driving a like number of support surfaces. In a typical application, a podiatry chair in accordance with this invention, may have a programmable back position and a programmable foot support position. Moreover, the seat may rest upon a base which may be automatically elevated to a programmed position and automatically tilted to a programmed tilt angle. A plurality of programmed position combinations may be established. In a preferred embodiment, the controller utilizes a programmed microprocessor, and the current flows through the electric motors are measured by Hall effect devices.

It is therefore an object of this invention to provide an automatically positionable chair which may be controlled to assume selectively programmed positions without the use of position feedback and to do so irrespective of load conditions.

Other and further objects of the invention will be apparent from the following description, the appended claims and the attached drawings.

DESCRIPTION OF THE PREFERRED EMBODIMENTS

Figure 1:
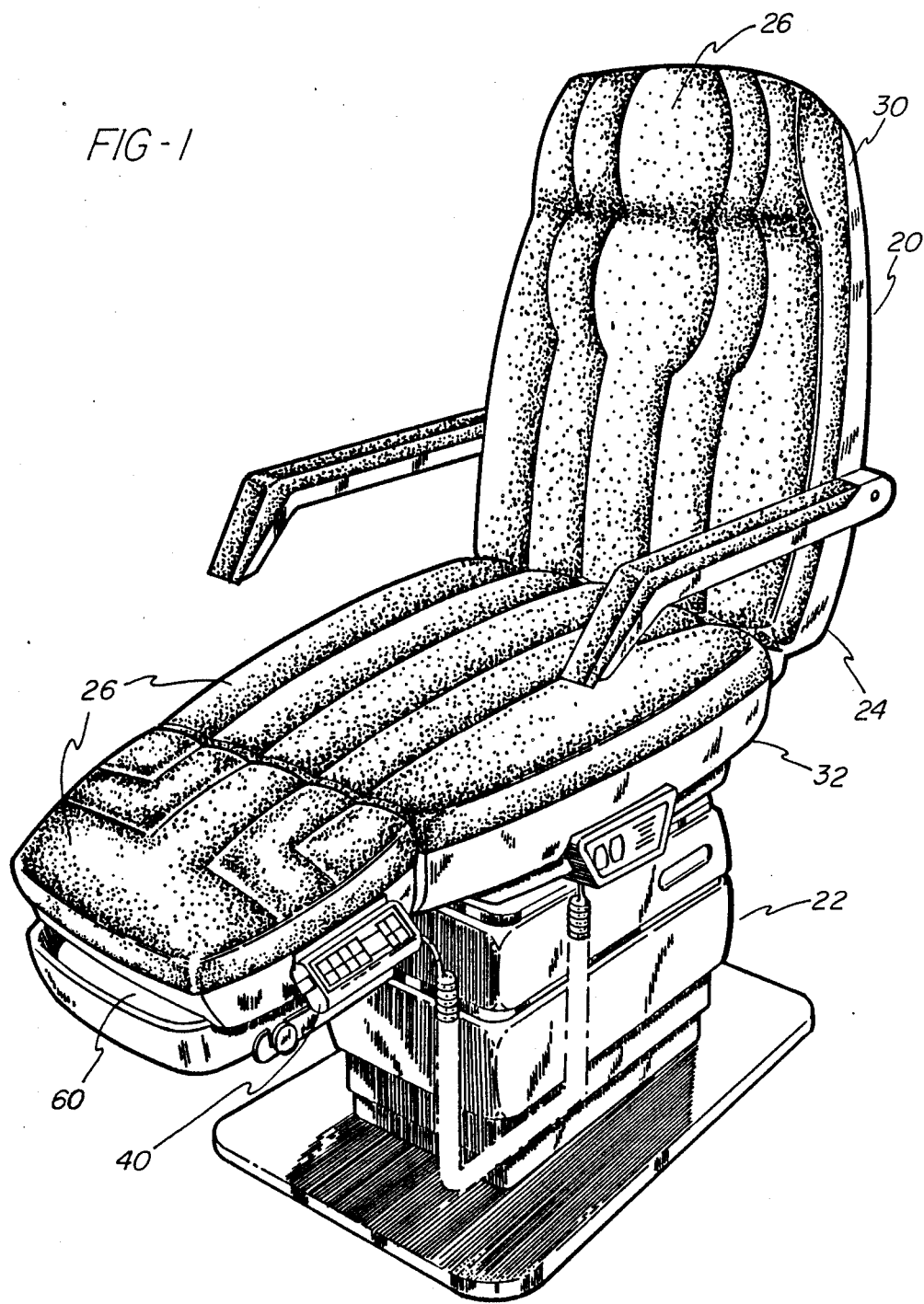
FIG. 1 is a perspective view of a podiatry chair.

A podiatry chair having programmable positions in accordance with the present invention is shown in FIG. 1. The chair 20 includes a base 22 to which a chair frame 24 is mounted. A plurality of upholstered sections 26 are removably mounted to chair frame 24 by hook and loop fabric strips or the like, so that upholstered sections 26 may be easily removed for cleaning or repair. The chair frame 24 comprises a back 30 pivotally attached to a seat 32. A foot support 60 is attached to seat 32. The chair model illustrated in FIG. 1 has a powered back, powered tilt, and powered elevation. A slightly different model of podiatry chair, as illustrated in FIGS. 2 and 3 may also have a powered foot support.

Figure 2:
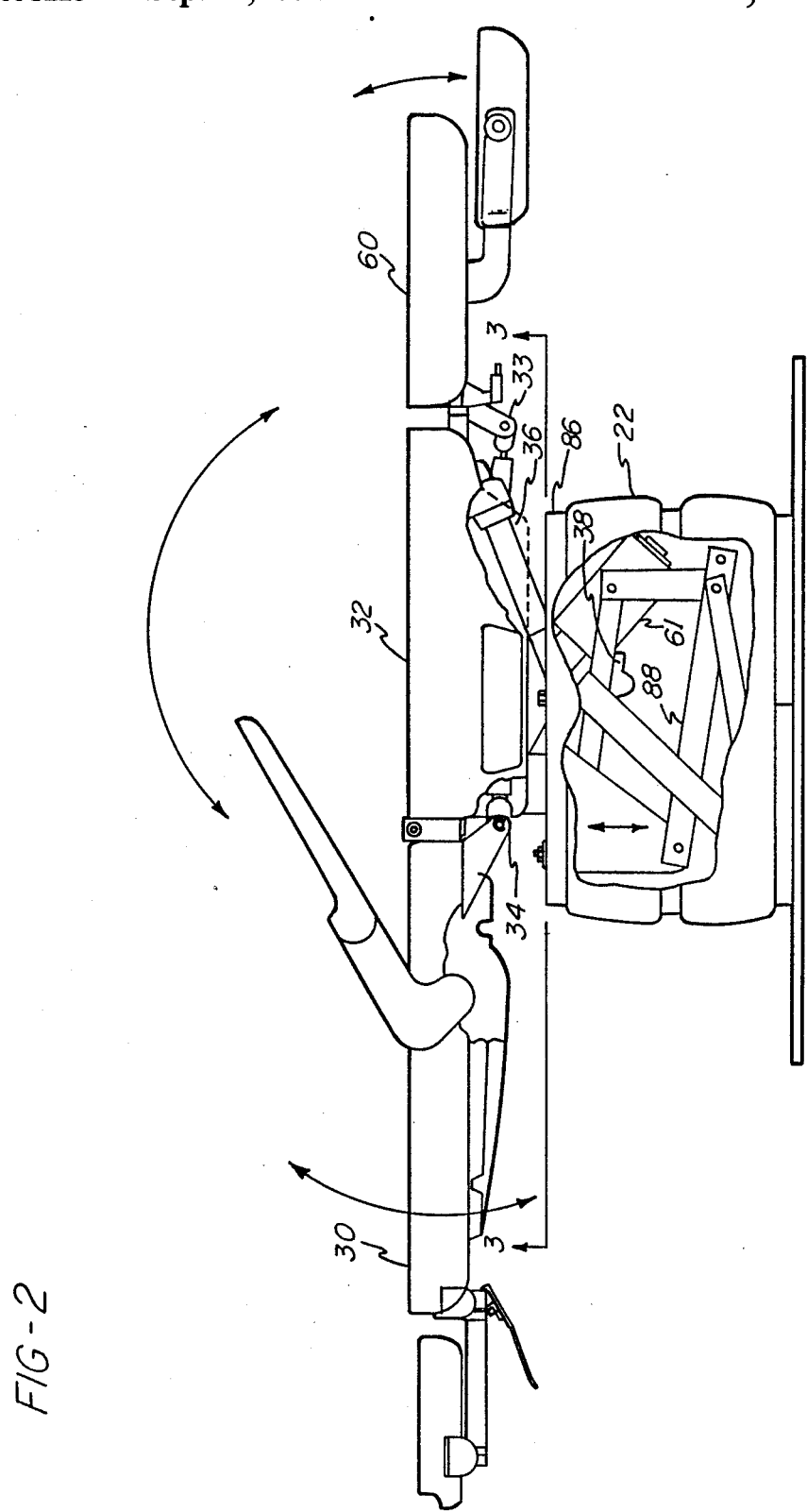
FIG. 2 is a side elevation view of a podiatry chair in a flat position.
Figure 3:
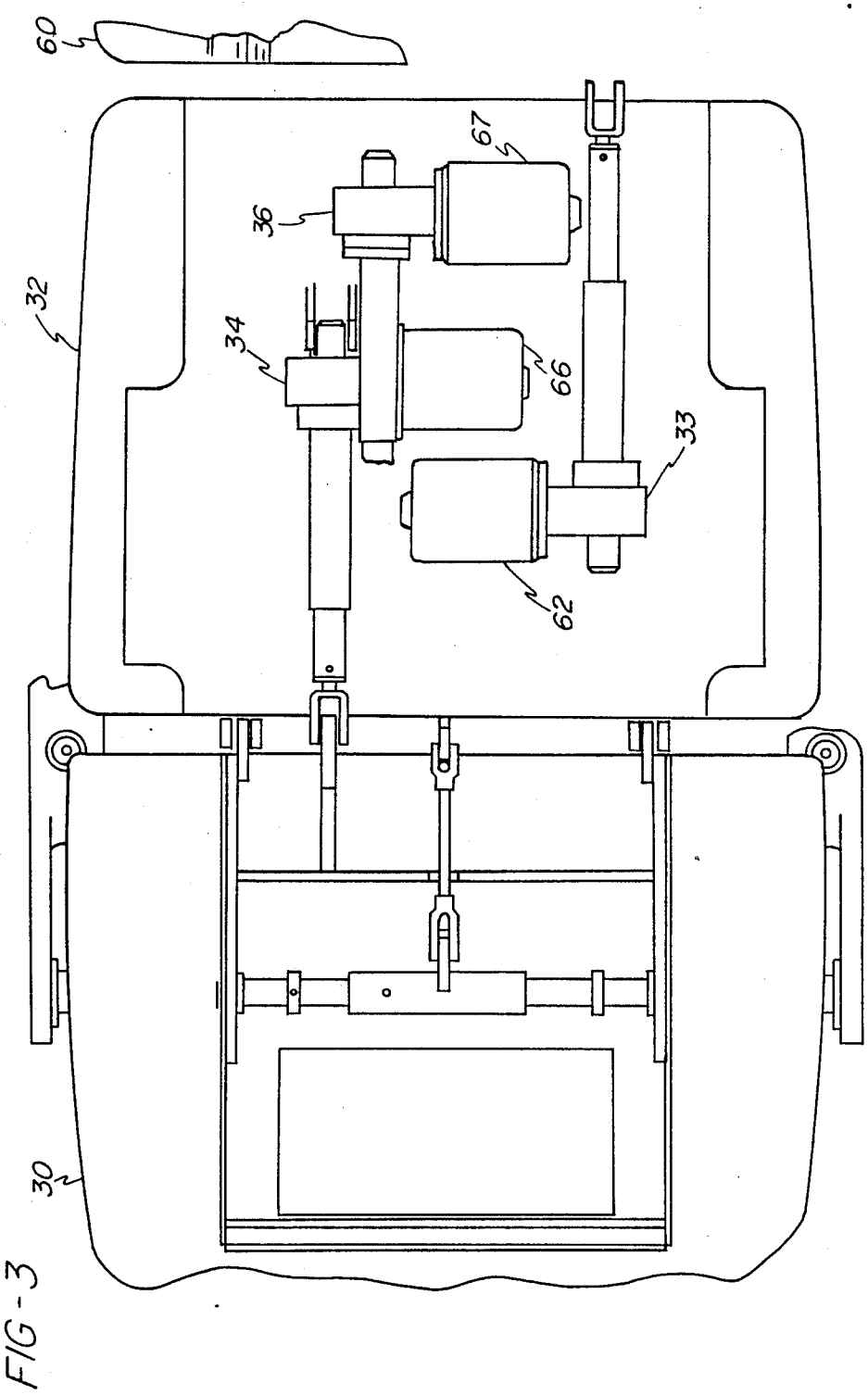
FIG. 3 is a bottom elevation view of a podiatry chair taken along lines 3—3 of FIG. 2.

Referring now to FIGS. 2 and 3, chair 20 is provided with four electric drive motors: including a base motor 61, a back motor 66, a tilt motor 67 and a foot motor 62. Motors 66, 67, 61 and 62 are reversibly operated to power a back actuator 34, a tilt actuator 36, a base actuator 38, and a foot actuator 33 respectively. Controls for the drive motors comprise a series of switches mounted in a hand control unit 40 (FIG. 1) detachably mounted on the side of foot support 60. Hand control unit 40 also includes switches for programming the automatic control, as hereinafter described.

Actuators 34 and 36 include a screw shaft and gearing means or the like for enabling the respective motors to rotate their shafts. A nut is mounted on each shaft for converting the rotary motion of the shaft into linear motion of actuator arms 68 and 69. Actuator arms 68 and 69 in turn position back 30 and tilt seat 32. Foot actuator 33 operates in a similar manner for angular positioning of foot support 60.

Actuator 38 is mounted in base 22 and is secured to upper plate 86. Base actuator 38 converts the rotary motion of base motor 61 into linear motion for operation of a scissors mechanism 88, as illustrated in FIG. 2.

Figure 4:
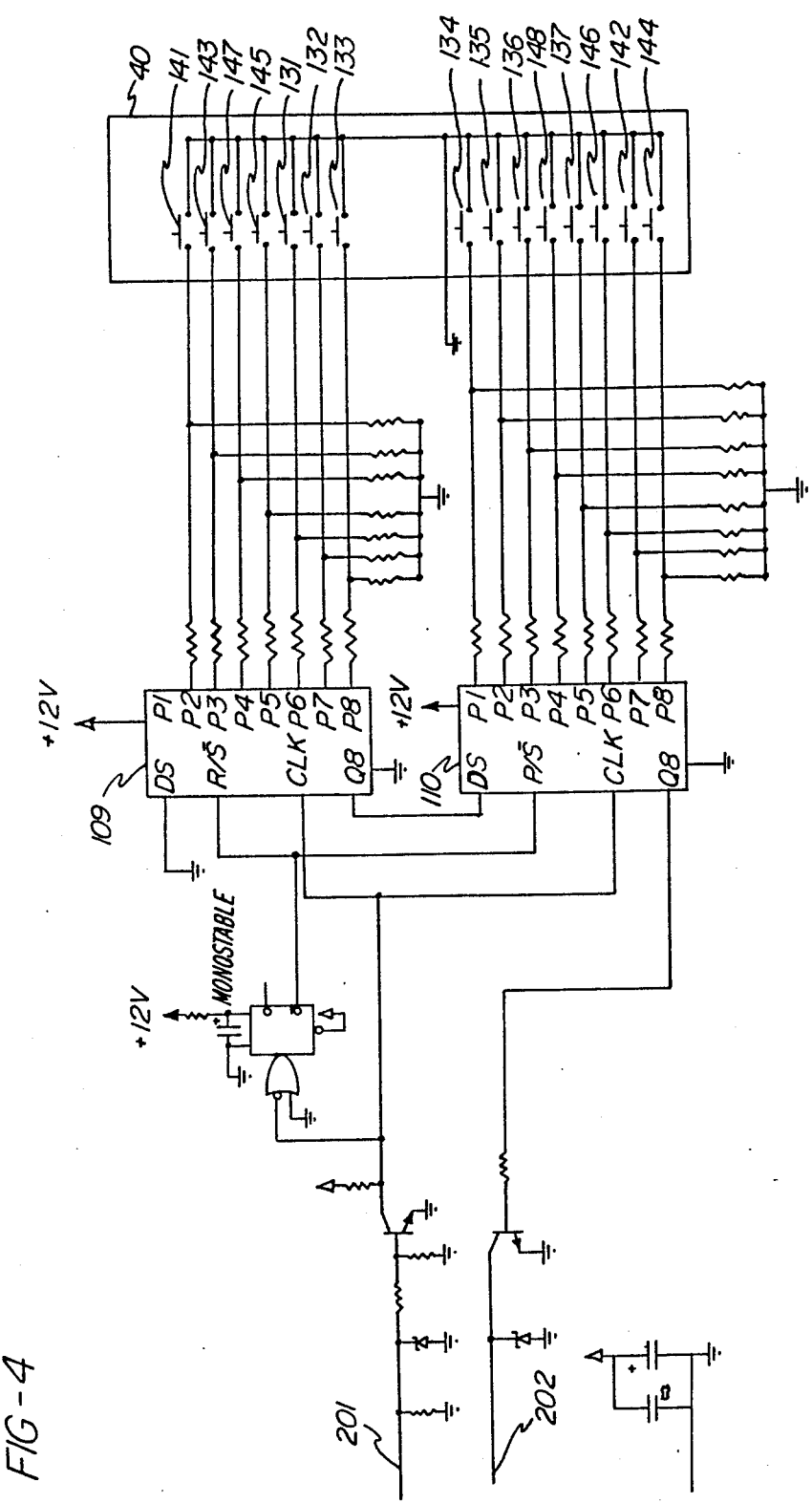
FIG. 4 is a schematic electric diagram illustrating connections for a hand held program controller.
Figure 5A:
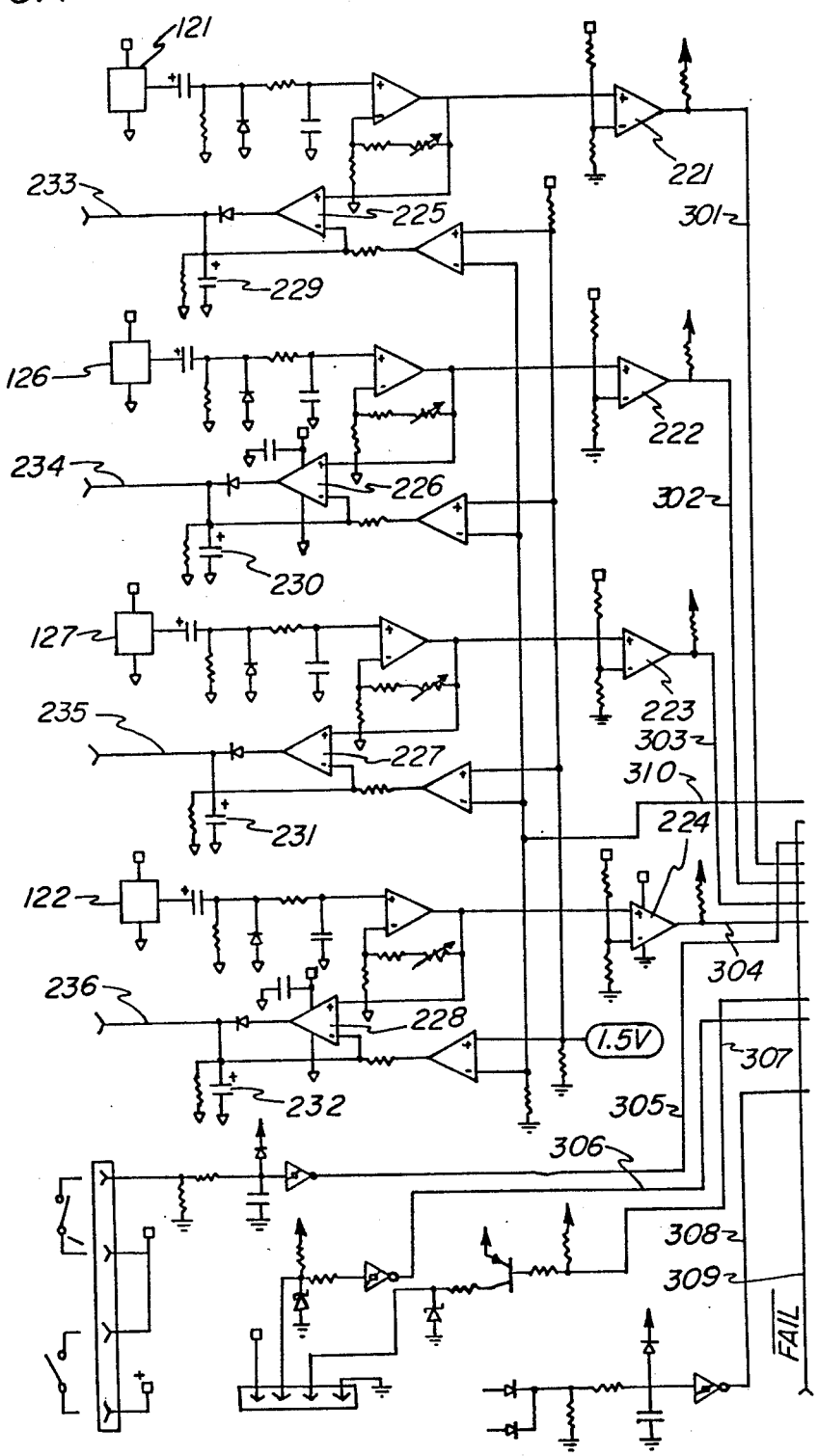
FIGS. 5A-5C are an electrical schematic diagram of a microprocessor connected for open loop control of drive motors for a programmable podiatry chair.
Figure 5B:
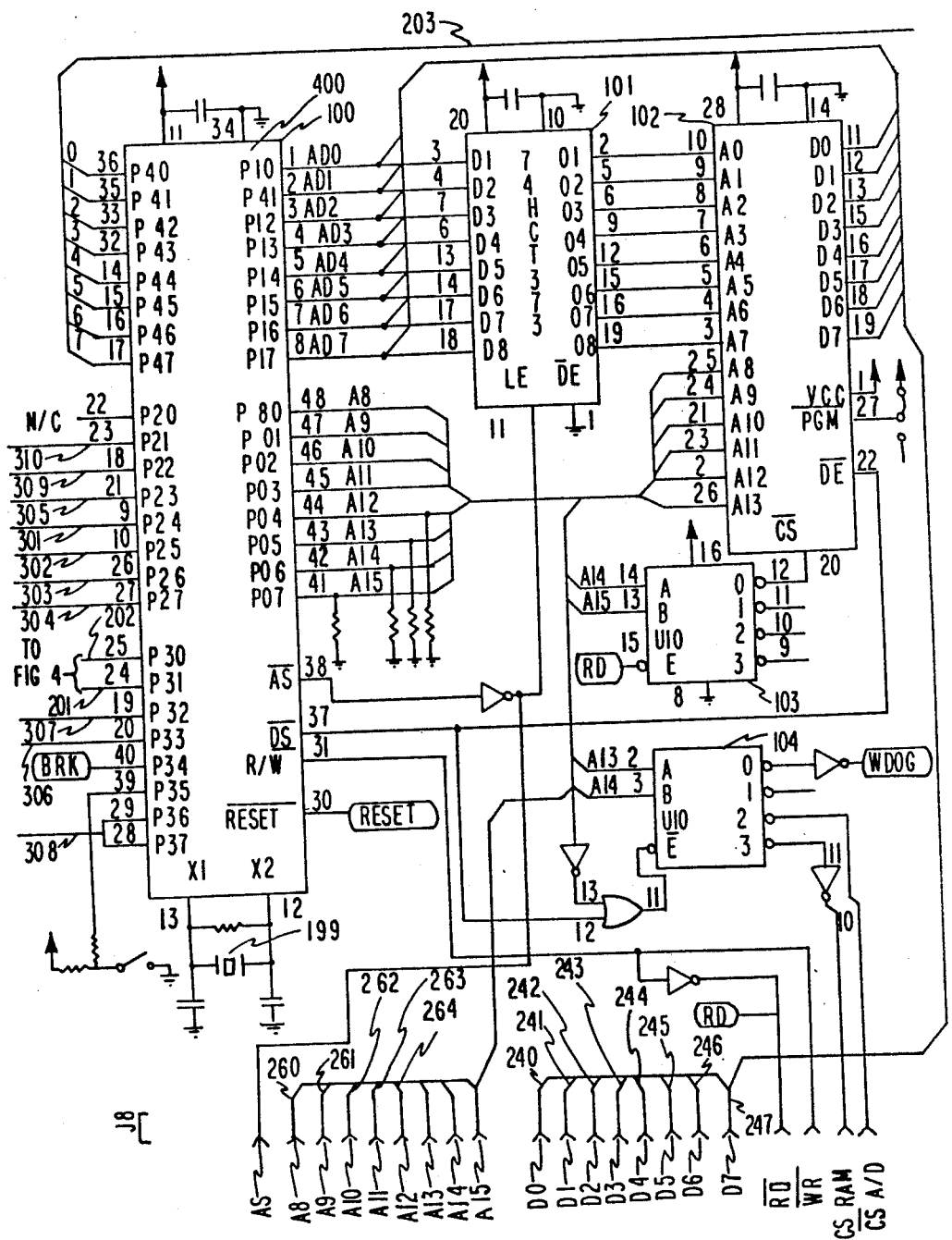
Figure 5C:
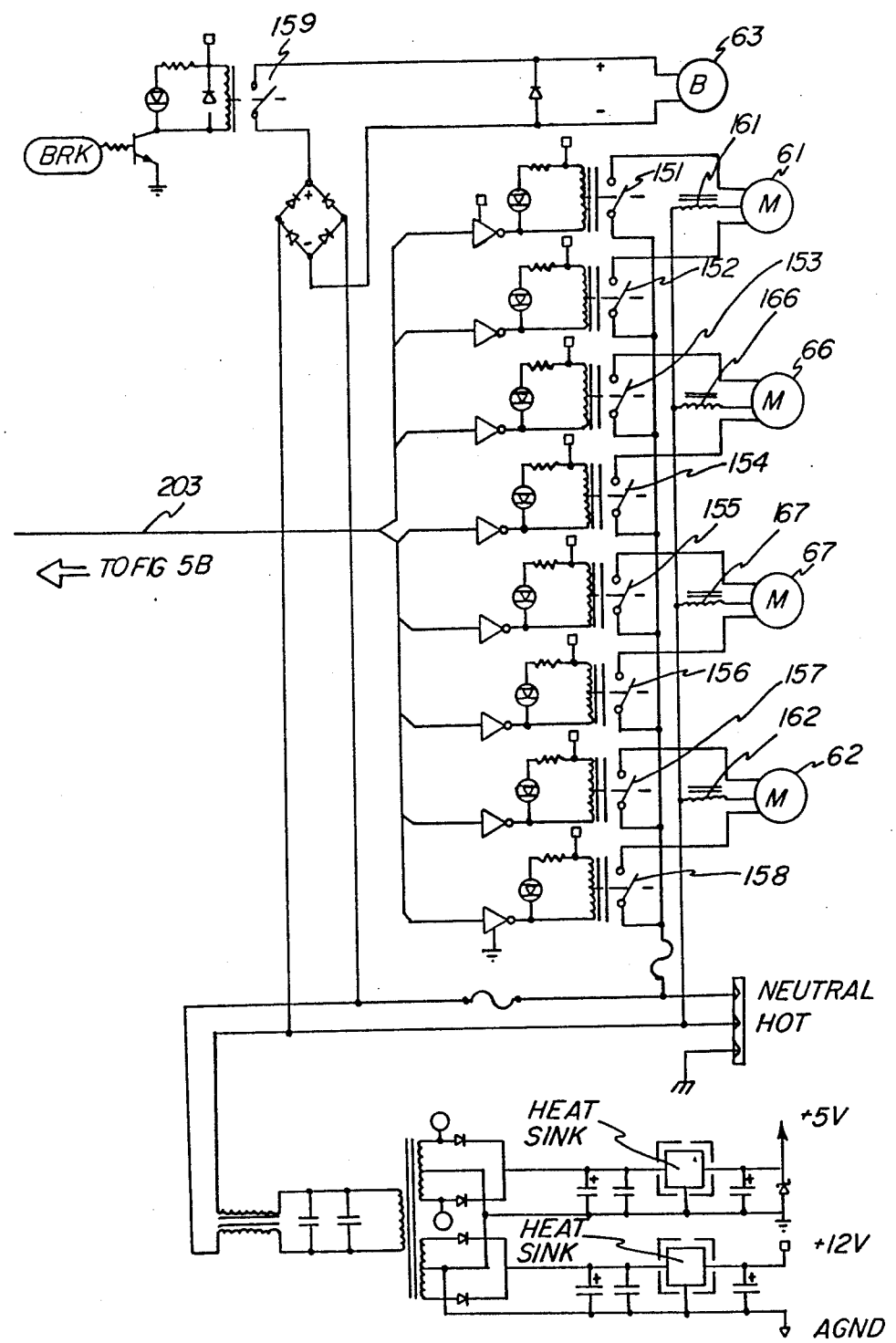

The control system for the chair is illustrated in FIGS. 4, 5A-5C, 6A, 6B and 7. The heart of the control system is a microprocessor 100 which is illustrated in FIG. 5B as having pin connections corresponding to those of a microprocessor sold by Zilog, Inc. under the trademark Super8. Clock pulses for microprocessor 100 are provided by a 12 MH$_z$ crystal.

Pin numbers 14-17, 32, 33, 35 and 36 of microprocessor 100 are connected to a cable 203, which in turn is connected to solenoid operated switches 151-158. Microprocessor 100 selectively closes switches 151-158 (FIG. 5C) for powering and directionally controlling base motor 61, back motor 66, tilt motor 67, and foot motor 62. Closure of switch 151 causes rotation of base motor 61 in a direction which causes upward movement of base 22. Base 22 is driven downwardly by opening switch 151 and closing switch 152. Switches 153 and 154 similarly cause upward and downward motion of back 30, while switches 155 and 156 cause upward and downward tilting of seat 32, and switches 157, 158 cause downward rotation of foot support 60.

Electrical current for motors 61, 66, 67 and 62 flows through choke coils 161, 166, 167 and 162 respectively. Current flows through these choke coils are sensed by Hall effect devices 121, 126, 127 and 122 respectively (FIG. 5A). Output signals from the Hal effect devices are applied to operational amplifiers 221-224 which detect overcurrent conditions of the type which may occur when a foreign object interferes with motion of the chair. Output signals from operational amplifiers from 221-224 are applied to pin numbers 24-27 respectively of microprocessor 100 to stop the overcurrent condition by opening the appropriate ones of switches 151-158.

Hand control 40 is connected to microprocessor 100 by means of lines 201, 202. The connection of those lines into hand control unit 40 is illustrated in FIG. 4. Unit 40 has fifteen switches 131-137 and 141-148, which are sequentially tested by 8-bit parallel to serial converters 109, 110. Microprocessor 100 transmits a sequence of clock pulses on line 201 to integrated circuits 109, 110 which return a code on line 202 identifying the state of each of the switches in hand control unit 40. The functions of these switches are identified in Table I.

As indicated by Table I, an operator may move foot support surface 60 in the upward direction by closing switch 147. Thereafter, upward movement may be interrupted by activating the stop switch 135. The operator may similarly operate switches 142-148 in combination with stop switch 135 to achieve any desired relative positions of the moveable chair surfaces. Once a desired positioned combination has been achieved, a calculated position set is programmed into the system by actuating the "Program" switch 134 and any one of the four positions select switches 131, 133, 136, 137. The latter four switches enable a podiatrist to program up to four position combinations into the control system. These four position combinations may be selected to meet his specific professional needs. The chair may be directed to return automatically to any of these positioned combinations by activating the associated one of switches 131, 133, 136 or 137. An "Auto Return" switch 132 is provided for commanding a return to the home position.

It is a feature of this invention that the chair may be controlled automatically to move to selectively programmed positions wthout using any position sensing transducers. This is accomplished by digitizing the analog output signals from Hall effect devices 121, 126, 127 and 122 and using these digitized outputs to solve a position control algorithm. The algorithm as hereinafter described, associates motor current with speed and integrates the speed over time to establish a computed position.

Figure 6A:
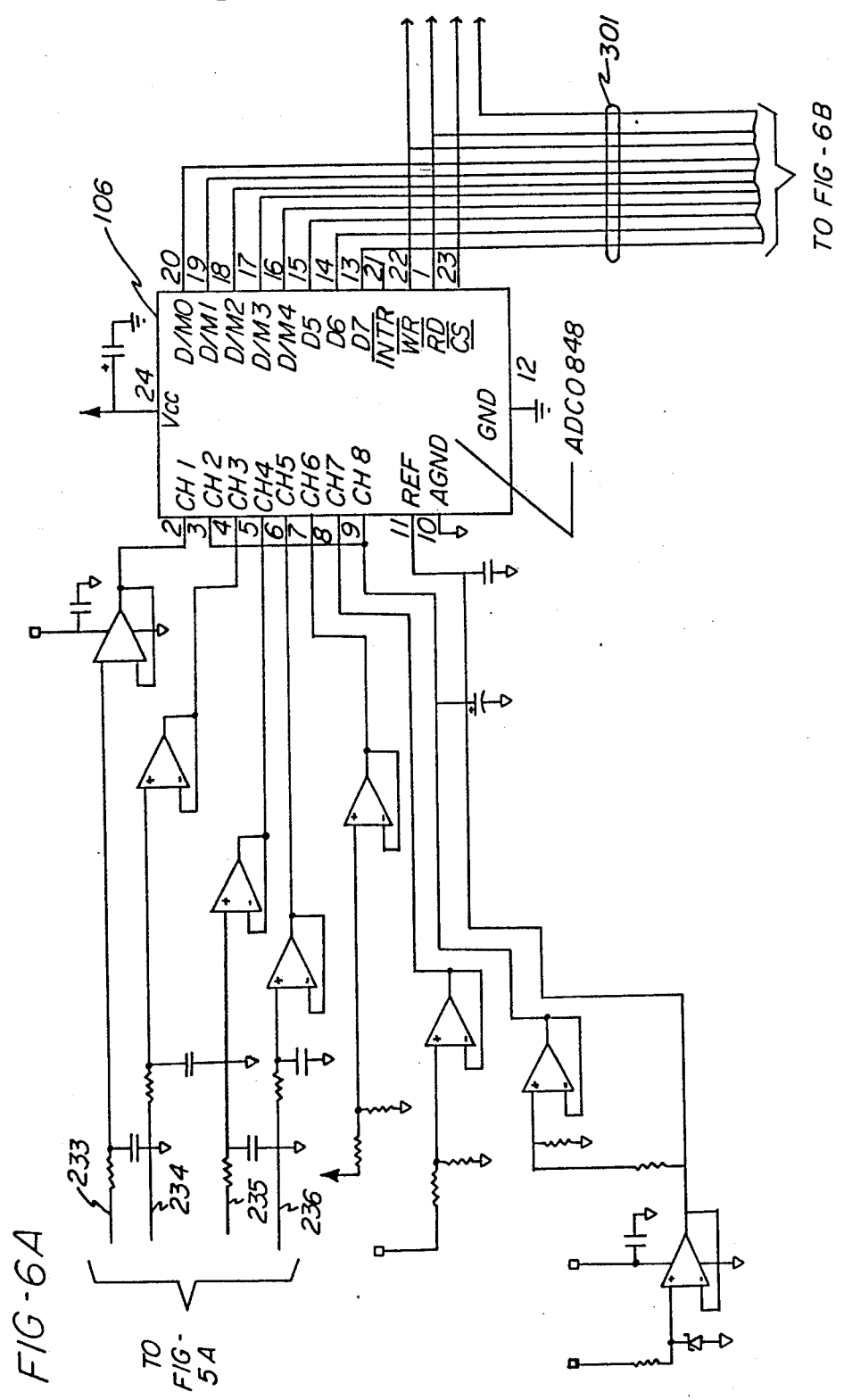
FIGS. 6A and 6B are an electrical schematic diagram of circuitry for transmitting motor current measurements to the microprocessor arragement illustrated in FIGS. 5A-5C.
Figure 6B:
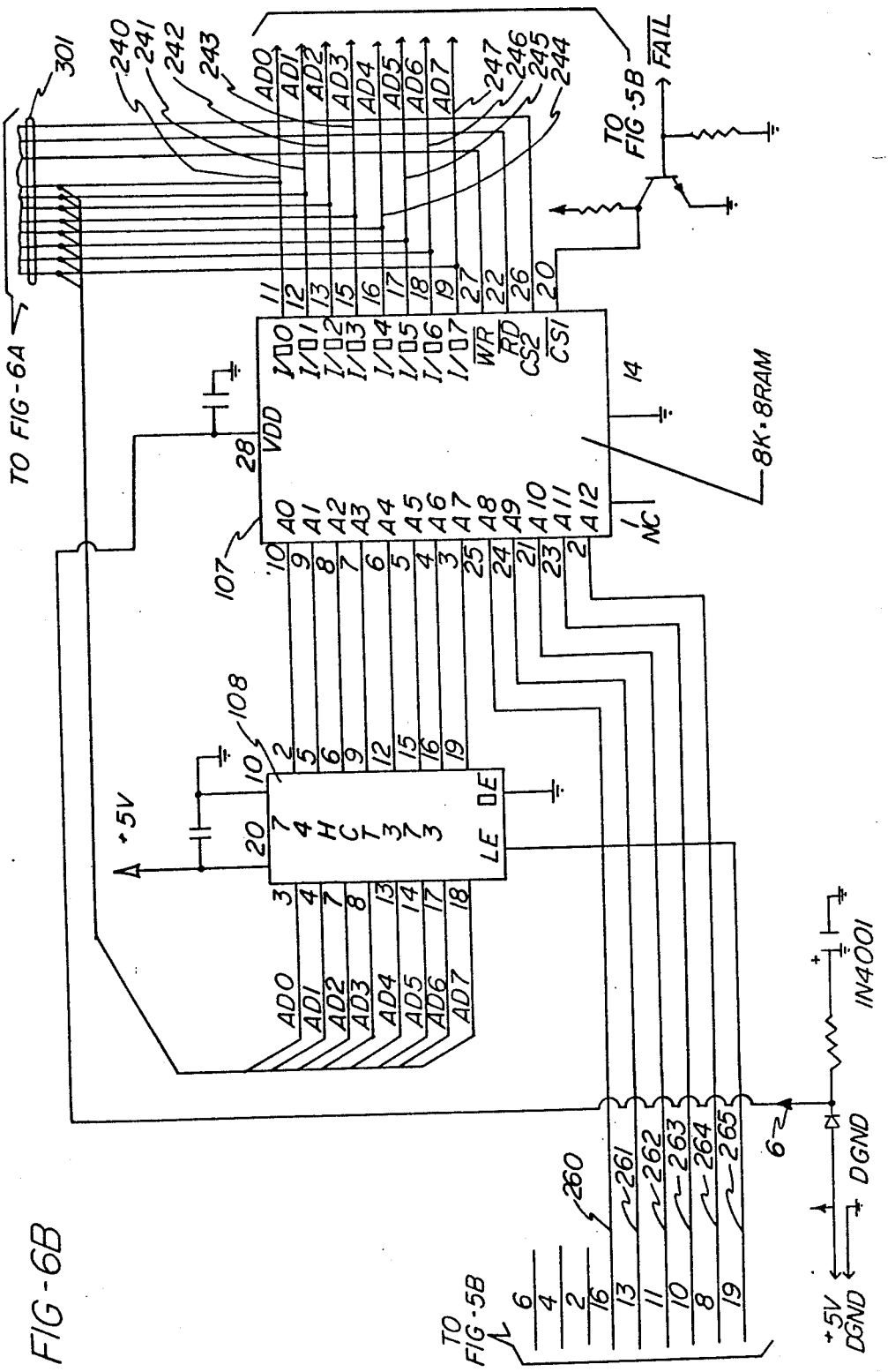

Digitizing of the analog output signals from the Hall effect devices is performed by analog-to-digital converter 106 (FIG. 6A). However, prior to digitizing, the Hall effect signals are processed by peak amplifiers 225-228. These peak amplifiers are connected to one-microfarad capacitors 229-232 respectively for providing output signals which represent the average peak currents through choke coils 161, 166, 167 and 162. These average peak current signals are applied to lines 233-236 for application to the input terminals of A/D converter 106. A/D converter 106 produces digitized equivalents of the average peak choke coil currents on lines 240-247 for application to pin numbers 1-8 of microprocessor 100.

Figure 7:
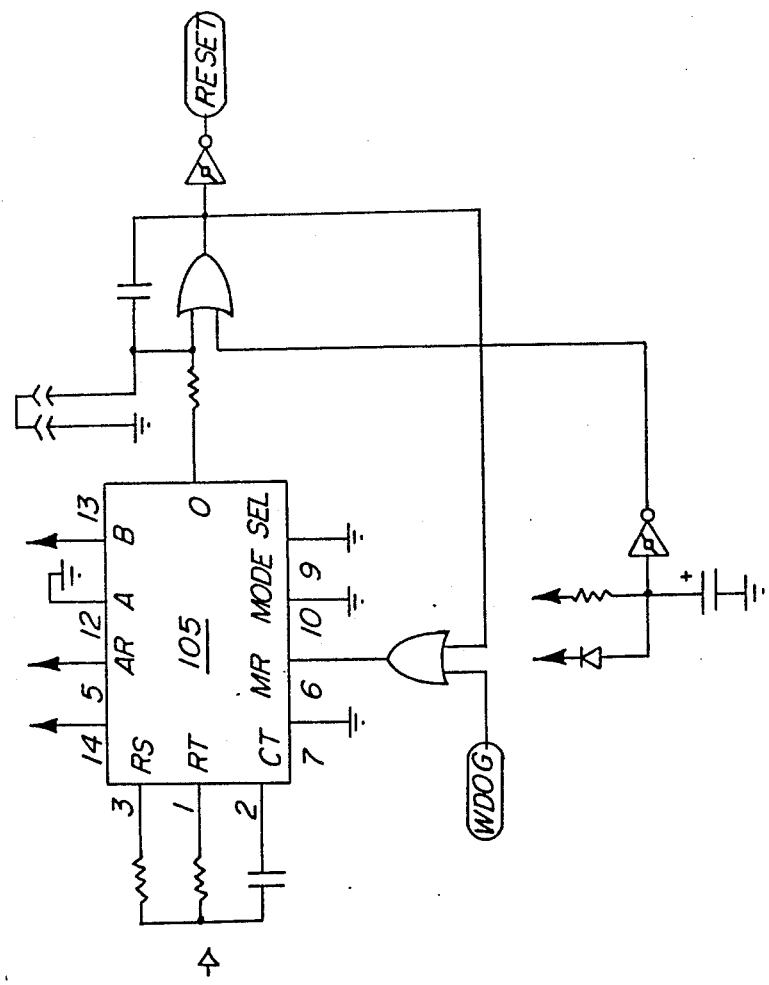
FIG. 7 is an electrical schematic diagram of connections for a watchdog circuit.

Microprocessor 100 also receives programming codes from integrated circuit 102 which is a 16K by 8-bit EPROM. EPROM 12 operates under control of an address decode latch 101. The computing circuitry also includes an address chip select decoder 103 for selection of EPROM 102 and another address chip select decoder 104 for selection of a watchdog circuit comprising a clock divider 105 (FIG. 7). The watchdog circuit generates a microprocessor reset signal, if it doesn't receive a periodic toggle signal from integrated circuit 104. This disables the motors in the event of a logic error or a failure of memory. However, if a problem is caused by a "glitch" induced by an external cause, the system will resume operating automatically after the reset.

It is another feature of the position control system that programmed position control information may be stored for up to 48 hours. Such storage is accomplished through an 8K×8 RAM 107 connected by a lead line 250 to a large capacitor 251. Capacitor 251 may have a capacitance of about 1 farad which may store sufficient charge to enable the above-noted data retention by RAM 107. Thus an operator may program the chair and then shut down overnight without losing the program data. Positional data is supplied by microprocessor 100 to RAM 107 via address/data bus lines 240-247. Address information (low order bits) is supplied by address/data bus lines 240-247 via address latch 108 and by address bus lines 260-264 (high order bits).

As noted above, this invention permits the chair surfaces to be driven to preprogrammed positions by solving algorithms which relate measured motor currents to motor speeds. It is important to know the motor speed, because variations in the weight of the patient who is seated on the chair affect the motor speed and hence the time required for the control surface to reach a preprogrammed position. Knowing the speed of the motor, it is possible to integrate this speed over the movement time to obtain a calculated position. However, it is not necessary to know the actual position, as calculation of an appropriately repeatable position parameter is sufficient. If such a position parameter is calculated during a programming run the corresponding actual position may be achieved during a working run by operating the motors and repeating the calculations until the same value of the position parameter has been calculated.

The algorithm relating motor speed to motor current will vary with motor design details but can be readily established in an experimental procedure by applying the design working voltage to the motor and operating the motor against a continuously varying load. As the load varies the supply current and shaft angular velocity are simultaneously measured and recorded. A plot of shaft angular velocity against current establishes the algorithm. The algorithm may be expressed in equation form by conventional curve fitting. As an alternative the algorithm may be simply reduced to a tabular form and stored in memory. However, the tabular form is avoided where possible, because it uses up large chunks of memory.

It has been found that for many motors the algorithm has a fairly linear form over the current range of interest, so that motor speed can e derived to a fair degree of accuracy by the expression:

$$S = -K_1 C + K_2$$

where:
S is the motor speed
C is the motor current
$K_1 + K_2$ are constants to be experimentally determined It has also been found that the above expression is not accurate for the conditions which obtain during starting and stopping. However, it is generally satisfactory to assume a constant average speed (independent of load) during these time periods. That speed, again, is determined experimentally.

In general the motor position is given by the equation:

$$X = S dt = -K_1 C dt + K_2 T$$

where T is the total elapsed time.

If the starting time period is $G_1$ and the stop period is $G_2$, and the motor has an average speed $S_A$ during these periods, then to a fairly good approximation:

$$X = S_A(G_1 + G_2) + K_2(T - G_1 - G_2) - K_1 C dt$$

For a microprocessor computing at regularly timed intervals t $$X = S_A(G_1 + G_2) + K_2 t - K_1 C t$$

where the summations are taken over the time interval from $G_1$ to $T - G_2$.

In operation during a working run the microprocessor begins computing at the instant of motor start by calculating (or looking up in memory) the term $S_A(G_1 + G_2)$ and placing this value in a position register. It thereafter counts time intervals until $t = G_1$ which is the known end of the motor start-up phase. Then the microprocessor calculates $(K_2 - K_1 C) t$ for each computing cycle and adds this into the position register. This is continued until the position register holds a predetermined target value. The time then is (by definition) $T - G_2$, and the drive motor is switched off automatically. For a programming run the operator switches the drive motor off manually when a desired position has been reached, and the value then in the position register is stored to become a new target value. In practice, since only a position parameter expressing a relative distance is required, $G_1$ and $G_2$ are expressed in terms of the number of elapsed computing cycles, and t is set equal to 1.0.

A routine implementing the above technique in SUPER 8 assembly language for foot motor 62 is listed in Table II.

In order to understand Table II it may be observed that the above-noted term $K_2 - K_1 C$ may be rewritten as $K_1 (C - K_2/K_1)$. The program for the foot includes routines for running the foot motor up and running the foot motor down. Within these routines there are subroutines covering the two alternative conditions wherein the measured current is greater than or less than the no load current.

Referring now to program line nos. 721–730 for foot motor up and measured current greater than no load current and making the substitutions:

C=AV_FT

K₂/K1=UP_NL_CUR_FT

K₁=UP_NL_FAC_FT

It may be seen that the computer performs a series of steps which calculate the term $K_2$-$K_1$C. The calculated value is added into a register known as ADD_FT. Other program listings, not shown, include similar routines for simultaneously controlling the position of motors G1, G6 and G7.

It will be appreciated that frictional losses, motor slippage and cumulative computing errors will cause errors in the calculated motor position which will grow with the passage of time. Such errors are small enough to be unobjectionable in an automatically positionable chair. In any event they may be removed by periodically returning the chair to the home position. When this is done the position registers are all automatically zeroed.

While the form of apparatus herein described constitutes a preferred embodiment of this invention, it is to be understood that the invention is not limited to this precise form of apparatus, and that changes may be made therein without departing from the scope of the invention which is defined in the appended claims.

TABLE I

| Switch Functions For Hand Control | |
|---|---|
| Switch No. | Function |
| 131 | Select Position 3 |
| 132 | Auto Return |
| 133 | Select Position 1 |
| 134 | Program |
| 135 | Stop |
| 136 | Select Position 2 |
| 137 | Select Position 4 |
| 141 | Base Up |
| 142 | Base Down |
| 143 | Back Up |
| 144 | Back Down |
| 145 | Tilt Up |
| 146 | Tilt Down |
| 147 | Foot Up |

TABLE I-continued

| Switch Functions For Hand Control | |
|---|---|
| Switch No. | Function |
| 148 | Foot Down |

TABLE II

2500 A.D. Super 8 Macro Assembler - Version 4.02a

```
Input  Filename : c:\2500ad\midmark\src\for_ft.src
Output Filename : c:\2500ad\midmark\obj\for_ft.obj
Listing Has Been Relocated
```

```
602                         .list on
603                         .title      MIDMARK PODIATRY TABLE 416, 417, 414
604                         .subtitle   FOR_FT.SRC
605                         ;
606                         .GLOBAL     FOR_FT
607                         ;_____
608                         ;
609    EF03  FF             FOR_FT:     NOP                         ;TEST ONLY, REPLACE WITH A (RETURN) AFH
610    EF04  70 D6                      PUSH    RP0                 ;
611    EF06  70 D7                      PUSH    RP1                 ;SAVE REGISTER PIONTER
612                         ;
613    EF08  31 02                      SRP0    #000H               ;PIONT TO TEMP WORKING REG
614    EF0A  31 69                      SRP1    #068H               ;PIONT TO TM_XXXX REG
615                         ;_____
616                         ;      _____       _____       _____
617                         ;     |        |     |        |     |        |
618                         ;     |_____|     |_____|     |_____|
619                         ;      CNT_XX         INDEX_XX        ADJ_XX
620                         ;_____
621                         ;
622                         ;TEST FOR THE STOP EDGE
623                         ;
624    EF0C  76 61 C0                   TM      MASK,#11000000B     ;TEST FOR THE LACK OF A T_EDGE
625    EF0F  6D F0 2A                   JP      Z,STOP_FT           ;EDGE SETECTED, RUN STOP
626                         ;
627                         ;FORMULAS FOR RUN THE FOOT IN THE DOWN DIRECTION
628                         ;
629    EF12  76 61 80       FT_DWN_FOL: TM      MASK,#10000000B     ;TEST FOR FOOT DOWN
630    EF15  6D EF 9E                   JP      Z,FT_UP_FOL         ;NOT RUN, NEXT BIT
631                         ;
632    EF18  A6 3C 00                   CP      INDEX_FT,#000H      ;CHECK FOR STARTING FOROMULA
633    EF1B  6D EF 2D                   JP      EQ,SET_UP_DWN_FT    ;RUN SETUP DOWN FOROMULA
634    EF1E  A6 3C 01                   CP      INDEX_FT,#001H      ;CHECK FOR RUNNING FOROMULA
635    EF21  6D EF 3B                   JP      EQ,START_DWN_FT     ;START RUNNING DOWN FOROMULA
636    EF24  A6 3C 02                   CP      INDEX_FT,#002H      ;CHECK FOR RUNNING FOROMULA
637    EF27  6D EF 52                   JP      EQ,RUN_DWN_FT       ;START RUNNING DOWN FOROMULA
638    EF2A  8D EF 9E                   JP      FT_UP_FOL           ;DELAY OR DOES NOT NEED TO BE RUN
639                         ;
640    EF2D  E6 38 20       SET_UP_DWN_FT: LD   CNT_FT,#RUN_DELAY   ;DELAY BETWEEN START AND RUN
641    EF30  A7 71 40 F9                LDE     TEMPR7_R7,DWN_ST_CT_FT ;RUN FORMULA, DELAY FOR FT_CNT
642    EF34  79 44                      LD      ADJ_FT,TEMPR7_R7    ;MOVE ADJ_FT
643    EF36  20 3C                      INC     INDEX_FT            ;PIONT TO START
644    EF38  8D F0 2D                   JP      CLEAR               ;DONE
645                         ;
646    EF3B  A6 38 00       START_DWN_FT: CP    CNT_FT,#000H        ;CHECK IF START STILL NEEDS ADJUSTING
647    EF3E  EB 05                      JR      NZ,START_DWN_ADJ    ;ADJUSTMENT STILL NEDEDED
648    EF40  20 3C                      INC     INDEX_FT            ;PIONT TO RUN
649    EF42  8D F0 2D                   JP      CLEAR               ;DONE
650    EF45  A6 44 00       START_DWN_ADJ: CP   ADJ_FT,#000H        ;DEC ONCE EVERY 20mS UNTIL ZERO
```

```
651  EF48  6D F0 2D              JP    Z,CLEAR              ;DONE
652  EF4B  00 44                 DEC   ADJ_FT               ;ADJUST -1 PER 20mS
653  EF4D  80 68                 DECW  TM_FOOT              ;START COMPENSATION
654  EF4F  8D F0 2D              JP    CLEAR                ;DONE
655                        ;
656  EF52  A7 51 30 F9   RUN_DWN_FT: LDE TEMPR5_R5,UP_NL_CUR_FT ;MOVE NO LOAD CURRENT TO REG
657  EF56  A4 05 14              CP    AV_FT,TEMPR5         ;
658  EF59  AB 07                 JR    GT,AV_GT_NL_DWN      ;COMP FOR AVERAGE GREATER THAN NO_LOAD
659  EF5B  1B 23                 JR    LT,AV_LT_NL_DWN      ;COMP FOR AVERAGE LESS THAN NO_LOAD
660  EF5D  80 68                 DECW  TM_FOOT              ;EQUAL, NO COMP
661  EF5F  8D F0 2D              JP    CLEAR                ;DONE
662                        ;
663  EF62  E4 14 06      AV_GT_NL_DWN: LD TEMPR6,AV_FT      ;SAVE COPY OF AV_FT
664  EF65  24 05 06              SUB   TEMPR6,TEMPR5        ;GET THE DIFFERENCE AVERAGE TO NO_LOAD
665  EF68  A7 71 21 F9           LDE   TEMPR7_R7,DWN_NL_FAC_FT ;GET UP_FACTOR_FT
666  EF6C  84 07 06              MULT  TEMPR6,TEMPR7        ;ADJUST WITH FACTOR MULTI IN
667  EF6F  96 FF 06              DIV   TEMPR6,#0FFH         ;
668  EF72  24 07 40              SUB   ADD_FT,TEMPR7        ;ADD ADJUSTMENT FACTOR INTO RUN COUNT
669  EF75  36 69 00              SBC   TM_FOOTR9,#000H      ;RIPPLE CARRY THROUGH
670  EF78  36 68 00              SBC   TM_FOOTR8,#000H      ;RIPPLE CARRY THROUGH
671  EF7B  80 68                 DECW  TM_FOOT              ;
672  EF7D  8D F0 2D              JP    CLEAR                ;DONE
673                        ;
674  EF80  E4 14 06      AV_LT_NL_DWN: LD TEMPR6,AV_FT      ;SAVE COPY OF AV_FT
675  EF83  24 06 05              SUB   TEMPR5,TEMPR6        ;GET THE DIFFERENCE AVERAGE TO NO_LOAD
676  EF86  A7 71 21 F9           LDE   TEMPR7_R7,DWN_NL_FAC_FT ;GET UP_FACTOR_FT
677  EF8A  84 07 06              MULT  TEMPR6,TEMPR7        ;ADJUST WITH FACTOR MULTI IN
678  EF8D  96 FF 06              DIV   TEMPR6,#0FFH         ;
679  EF90  04 07 40              ADD   ADD_FT,TEMPR7        ;ADD ADJUSTMENT FACTOR INTO RUN COUNT
680  EF93  16 69 00              ADC   TM_FOOTR9,#000H      ;RIPPLE CARRY THROUGH
681  EF96  16 68 00              ADC   TM_FOOTR8,#000H      ;RIPPLE CARRY THROUGH
682  EF99  80 68                 DECW  TM_FOOT              ;
683  EF9B  8D F0 2D              JP    CLEAR                ;DONE
684                        ;
685                        ;FORMULAS FOR RUN THE FOOT IN THE UP DIRECTION
686                        ;
687  EF9E  76 61 40      FT_UP_FOL:   TM  MASK,#010000000B  ;TEST FOR FOOT UP
688  EFA1  6D F0 2D              JP    Z,CLEAR              ;NOT RUN, NEXT BIT
689                        ;
690  EFA4  A6 3C 00              CP    INDEX_FT,#000H       ;CHECK FOR STARTING FOROMULA
691  EFA7  6D EF B9              JP    EQ,SET_UP_UP_FT      ;RUN SETUP UP FOROMULA
692  EFAA  A6 3C 01              CP    INDEX_FT,#001H       ;CHECK FOR RUNNING FOROMULA
693  EFAD  6D EF C7              JP    EQ,START_UP_FT       ;START RUNNING UP FOROMULA
694  EFB0  A6 3C 02              CP    INDEX_FT,#002H       ;CHECK FOR RUNNING FOROMULA
695  EFB3  6D EF DE              JP    EQ,RUN_UP_FT         ;START RUNNING UP FOROMULA
696  EFB6  8D F0 2D              JP    CLEAR                ;DELAY OR DOES NOT NEED TO BE RUN
697                        ;
698  EFB9  E6 38 20      SET_UP_UP_FT: LD CNT_FT,#RUN_DELAY ;DELAY BETWEEN START AND RUN
699  EFBC  A7 71 50 F9           LDE   TEMPR7_R7,UP_ST_CT_FT ;RUN FORMULA, DELAY FOR FT_CNT
700  EFC0  79 44                 LD    ADJ_FT,TEMPR7_R7     ;MOVE ADJ_FT
701  EFC2  20 3C                 INC   INDEX_FT             ;PIONT TO START
702  EFC4  8D F0 2D              JP    CLEAR                ;DONE
703                        ;
704  EFC7  A6 38 00      START_UP_FT: CP CNT_FT,#000H       ;CHECK IF START STILL NEEDS ADJUSTING
705  EFCA  EB 05                 JR    NZ,START_UP_ADJ      ;ADJUSTMENT STILL NEDEDED
706  EFCC  20 3C                 INC   INDEX_FT             ;PIONT TO RUN
707  EFCE  8D F0 2D              JP    CLEAR                ;DONE
708  EFD1  A6 44 00      START_UP_ADJ: CP ADJ_FT,#000H      ;DEC ONCE EVERY 20mS UNTIL ZERO
709  EFD4  6D F0 2D              JP    Z,CLEAR              ;DONE
```

```
710  EFD7  00 44                      DEC   ADJ_FT              ;ADJUST -1 PER 20mS
711  EFD9  A0 68                      DECW  TM_FOOT             ;START COMPENSATION
712  EFDB  8D F0 2D                   JP    CLEAR               ;DONE
713                          ;
714  EFDE  A7 51 30 F9   RUN_UP_FT:   LDE   TEMPR5_R5,UP_NL_CUR_FT  ;MOVE NO LOAD CURRENT TO REG
715  EFE2  A4 05 14                   CP    AV_FT,TEMPR5        ;
716  EFE5  AB 07                      JR    GT,AV_GT_NL_UP      ;COMP FOR AVERAGE GREATER THAN NO_LOAD
717  EFE7  1B 23                      JR    LT,AV_LT_NL_UP      ;COMP FOR AVERAGE LESS THAN NO_LOAD
718  EFE9  A0 68                      INCW  TM_FOOT             ;EQUAL, NO COMP
719  EFEB  8D F0 2D                   JP    CLEAR               ;DONE
720                          ;
721  EFEE  E4 14 06    AV_GT_NL_UP:   LD    TEMPR6,AV_FT        ;SAVE COPY OF AV_FT
722  EFF1  24 05 06                   SUB   TEMPR6,TEMPR5       ;GET THE DIFFERENCE AVERAGE TO NO_LOAD
723  EFF4  A7 71 31 F9                LDE   TEMPR7_R7,UP_NL_FAC_FT  ;GET UP_FACTOR_FT
724  EFF8  84 07 06                   MULT  TEMPR6,TEMPR7       ;ADJUST WITH FACTOR MULTI IN
725  EFFB  96 FF 06                   DIV   TEMPR6,#0FFH        ;
726  EFFE  24 07 48                   SUB   ADD_FT,TEMPR7       ;ADD ADJUSTMENT FACTOR INTO RUN COUNT
727  F001  36 69 00                   SBC   TM_FOOTR9,#000H     ;RIPPLE CARRY THROUGH
728  F004  36 68 00                   SBC   TM_FOOTR8,#000H     ;RIPPLE CARRY THROUGH
729  F007  A0 68                      INCW  TM_FOOT             ;
730  F009  8D F0 2D                   JP    CLEAR               ;DONE
731                          ;
732  F00C  E4 14 06    AV_LT_NL_UP:   LD    TEMPR6,AV_FT        ;SAVE COPY OF AV_FT
733  F00F  24 06 05                   SUB   TEMPR5,TEMPR6       ;GET THE DIFFERENCE AVERAGE TO NO_LOAD
734  F012  A7 71 31 F9                LDE   TEMPR7_R7,UP_NL_FAC_FT  ;GET UP_FACTOR_FT
735  F016  84 07 06                   MULT  TEMPR6,TEMPR7       ;ADJUST WITH FACTOR MULTI IN
736  F019  96 FF 06                   DIV   TEMPR6,#0FFH        ;
737  F01C  04 07 48                   ADD   ADD_FT,TEMPR7       ;ADD ADJUSTMENT FACTOR INTO RUN COUNT
738  F01F  16 69 00                   ADC   TM_FOOTR9,#000H     ;RIPPLE CARRY THROUGH
739  F022  16 68 00                   ADC   TM_FOOTR8,#000H     ;RIPPLE CARRY THROUGH
740  F025  A0 68                      INCW  TM_FOOT             ;
741  F027  8D F0 2D                   JP    CLEAR               ;DONE
742                          ;
743                          ;MOTOR DONE, RESET INDEX PIONTER
744                          ;
745  F02A  E6 3C 00    STOP_FT:       LD    INDEX_FT,#000H      ;MOTOR STOPPED, RESET INDEX TO ZERO
746                          ;
747                          ;CLEAR TO EXIT
748                          ;
749  F02D  50 D7       CLEAR:         POP   RP1
750  F02F  50 D6                      POP   RP0                 ;REPLACED REGISTER PIONTER
751  F031  AF                         RET                       ;DONE
752                          ;
```

What is claimed is:

1. In a positionable chair comprising a moveable support surface, an electric motor for moving said support surface to a continuously variable series of work positions, a power supply for said electric motor and switch means for selectively connecting said motor to said power supply and causing said support surface to move to said work positions; improved positioning control apparatus comprising:

timing means for indicating the time consumed during movement of said support surface, sensing means for sensing the current drawn by said motor during said movement, computing means responsive to said timing means and to said sensing means for computing a position parameter related to the position of said support surface, and control means responsive to a target value of said position parameter for stopping said motor.

2. The improvement of claim 1 wherein said sensing means comprises a Hall effect device.

3. The improvement of claim 1 wherein said computing means comprises a programmed microprocessor.

4. The improvement of claim 1 wherein said computing means comprises a microprocessor programmed to calculate the speed of said motor as a linear function of said current and to compute said position parameter by repetitively calculating and summing said speed.

5. The improvement of claim 4 wherein said control means comprise means for causing said motor to run to a selected position, means for causing said microprocessor to calculate a position parameter as aforesaid, and means for causing said microprocessor to store said calculated position parameter as a target value thereof when said motor has reached said selected position.

6. An automatically positionable chair comprising:
   a plurality of movable support surfaces,
   an electric motor for each of said support surfaces, each said electric motor being connected for moving its associated support surface between a home position and a target position anywhere within the movement range of that support surface,
   timing means for indicating movement times for said support surfaces,
   current measuring means for measuring the currents drawn by said motors,
   computing means responsive to said timing means and said current measuring means for computing position parameters for said motors which are related to the actual position of said support surface,
   programming means for indicating target values for said position parameters, and
   control means for causing said electric motors to operate until the computed values of said position parameters are equal to said target values.

7. Apparatus according to claim 6 wherein said programming means comprises means for causing presently computed values of said position parameters to become said target values for future control of said motors.

8. Apparatus according to claim 7 wherein said moveable support surfaces comprise a moveable back, a tiltable seat and an elevatable base.

9. Apparatus according to claim 8 wherein said moveable support surfaces further comprise a moveable foot support surface.

10. Apparatus according to claim 7 wherein said computing means comprise a programmed microprocessor.

11. Apparatus according to claim 9 wherein said current measuring means comprises a plurality of Hall effect devices.

12. Apparatus according to claim 10 wherein said control means comprises means for storing said target values during times when said microprocessor is without power.

13. Method of positioning a chair surface comprising the steps of:
    using an electric motor to move said surface,
    repeatedly indicating intervals of movement time of said motor
    measuring the current drawn by said motor during each of said intervals,
    using the measured values of said current to calculate the speed of said motor during each of said intervals,
    multiplying said calculated speeds by the length of said interval to obtain increments of movement distance,
    summing said distance increments to calculate a position parameter, and
    stopping said motor when said position parameter has reached a predetermined target value.

14. Method of positioning a chair surface by an electric motor comprising the steps of:
    measuring the current drawn by said motor,
    using the measured value of said current to determine the speed of said motor,
    integrating said speed over time to obtain a position parameter, and
    stopping said motor when said position parameter has reached a predetermined target value.

15. Method according to claim 14 wherein said motor speed is calculated as a linear function of said current.

* * * * *